Jan. 15, 1957  J. C. HATHAWAY  2,777,999
FREQUENCY REJECTION SYSTEM FOR MECHANICAL FILTER
Filed May 7, 1953  2 Sheets-Sheet 1

INVENTOR.
JAMES C. HATHAWAY
BY
ATTORNEY

Jan. 15, 1957     J. C. HATHAWAY     2,777,999
FREQUENCY REJECTION SYSTEM FOR MECHANICAL FILTER
Filed May 7, 1953     2 Sheets-Sheet 2

INVENTOR.
JAMES C. HATHAWAY
BY
ATTORNEY

United States Patent Office 2,777,999
Patented Jan. 15, 1957

2,777,999
FREQUENCY REJECTION SYSTEM FOR MECHANICAL FILTER

James C. Hathaway, Glendale, Calif., assignor to Collins Radio Company, Cedar Rapids, Iowa, a corporation of Iowa Application May 7, 1953, Serial No. 353,627

13 Claims. (Cl. 333—71)

This invention relates in general to electromechanical filters and in particular to means for shaping the response curve of an electromechanical filter.

Electromechanical filters have been described in the co-pending patent applications Serial Numbers 283,340 and 248,011, filed April 21, 1952, and September 24, 1951, respectively, and are valuable to the electronics industry because of their very good frequency response.

It is an object of this invention to provide means for shaping the response characteristic of an electromechanical filter so as to increase the steepness of the response curve.

It is a further object of this invention to provide means for obtaining a frequency response curve with substantially vertical sides.

It is a feature of this invention to provide an electromechanical filter wherein auxiliary discs resonant at frequencies along the edge of the pass band of the filter are added to the filter so as to increase the steepness of the filter response.

Further objects, features and advantages of the invention will become apparent from the following description and claims when read in view of the drawings, in which:

Figure 1:
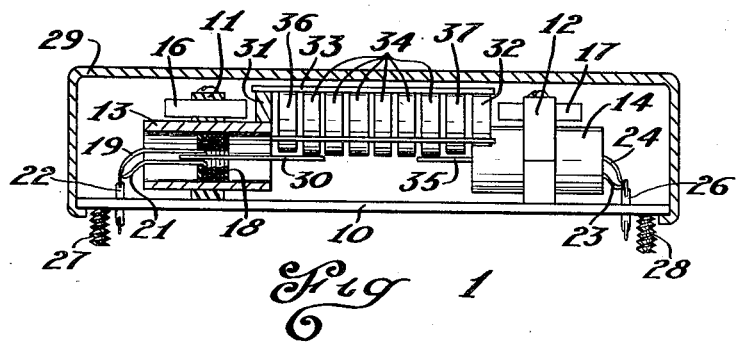
Figure 1 is a side partially sectioned view of an electromechanical filter according to the principles of this invention.
Figure 2:
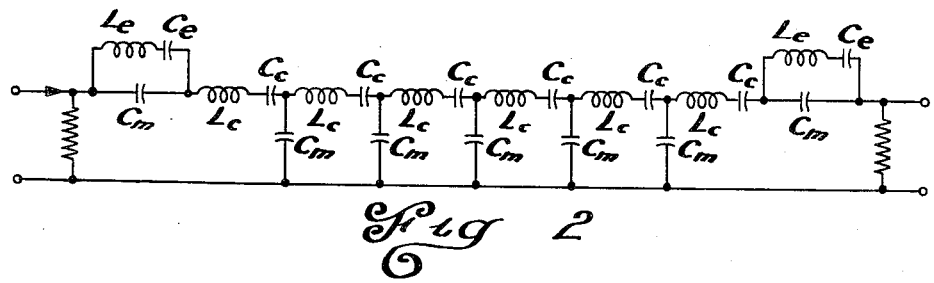
Figure 2 is an electrical equivalent of the filter shown in Figure 1.

Figure 1 illustrates a base plate 10 upon which are mounted a pair of stand-offs 11 and 12 that are formed with openings through which cylinders 13 and 14 extend. Biasing magnets 16 and 17 are supported by the stand-offs 11 and 12 above the cylinders 13 and 14.

The cylinders 13 and 14 are hollow as shown in the sectional view of the cylinder 13, and a coil 18 is mounted in each cylinder. The coil 18 mounted in cylinder 13 has a pair of input leads 19 and 21 which are connected, respectively, to terminals 22. In a similar fashion the coil 18 within the cylinder 14 is connected to leads 23 and 24 and to a pair of terminals 26 mounted in the base plate 10. Threaded support means 27 and 28 are attached to the base plate 10 and may be used for fastening the filter assembly to a chassis. A cover member 29 may be attached to the base plate 10 so that the filter may be evacuated and form a hermetically sealed container.

Mounted, respectively, to the cylinders 13 and 14 are mechanical supporting discs 31 and 32. Extending between the supporting discs 31 and 32 are a plurality of coupling wires 33 which are attached to the peripheries of the discs. Supported between the supporting wires 33 are a plurality of active discs 34. Immediately adjacent the discs 31 and 32 are curve-shaping discs 36 and 37. The shaping discs 36 and 37 are mounted between the support discs 31 and 32 and the active discs 34. End wires 30 and 35 are connected, respectively, to the peripheries of the end active discs 34 and extend through the coils 18 so that magnetostrictive coupling may occur.

The active discs 34 between the shaping discs 36 and 37 are tuned to the center frequency of the desired band pass, and in the absence of the discs 36 and 37 would have a frequency response similar to the electromechanical filter shown in patent application Serial Number 283,340, filed April 21, 1952, and entitled "Longitudinal Support of Mechanical Filter." However, the addition of the shaping discs 36 and 37 allow the edges of the response curve to be steepened. The discs 36 and 37 are shown as being of smaller diameter than the remaining discs 34, but it is to be realized that the diameters may be substantially the same and the thickness of the disc may be slightly different to obtain a different resonant frequency for these discs. The difference in diameters is exaggerated in the drawings.

Figure 4:
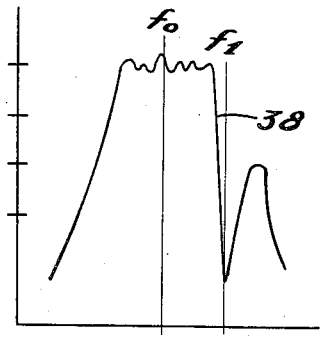
Figure 4 is a frequency response curve.
Figure 5:
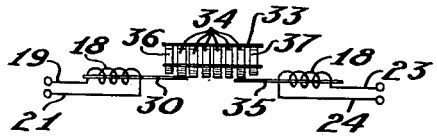
Figure 5 illustrates a mechanical filter according to this invention.

Figure 4 illustrates a response characteristic of a filter according to Figure 1 wherein the active discs 34 are tuned to the resonant frequency $f_0$ and the curve-shaping discs 36 and 37 are tuned to a frequency $f_1$ which might be, for example, adjacent the high frequency edge of the normal response curve.

Thus, the high frequency edge 38 of the response curve will be extremely steep due to the high impedance at the frequency $f_1$ caused by the addition of discs 36 and 37.

This may be explained by considering the electrical equivalent shown in Figure 1. Each of the active discs 34 between the shaping discs 36 and 37 may be considered as resonant elements comprising the series elements $C_c$ and $L_c$. The coupling between the discs is accomplished by the support wires 33 and is illustrated by the capacitors $C_m$. The wave-shaping discs 36 and 37 are illustrated by the series branch $L_e$ and $C_e$ and the portion of the rod 33 which extends between them to support them is equivalent to $C_m$.

Figure 3:
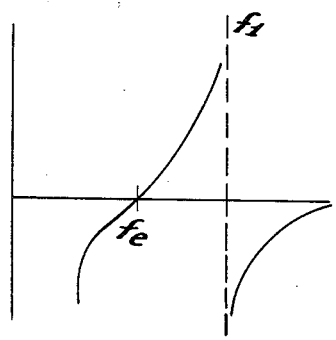
Figure 3 is a plot of reactance versus frequency.

The series resonance of $L_e$ and $C_e$ is illustrated in Figure 3 and occurs at the frequency $f_e$, whereas the parallel resonance of the discs and end coupling wires $L_e$, $C_e$ and $C_m$ occurs at $f_1$. It is seen that the impedance of the end section goes to infinity at $f_1$ thus causing a substantial drop in the response characteristic of the curve.

Figure 6:
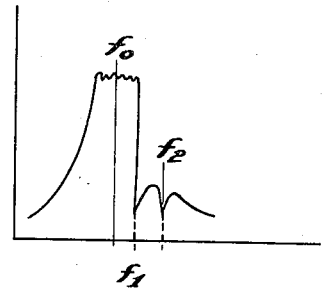
Figure 6 illustrates a response curve obtainable from the filter shown in Figure 5.

The response curve of Figure 4 is for the case where the shaping discs 36 and 37 are both resonant at frequency $f_1$. It is to be noted, however, that a peak to the right of $f$ still occurs and may be objectionable. This may be cut down by tuning one of the discs 36 and 37 to the frequency $f_1$ and the second one to a frequency of $f_2$ in the center of the second peak. This is illustrated in Figure 6.

Figure 7:
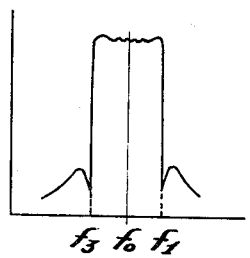
Figure 7 illustrates a different frequency response curve obtainable from the filter shown in Figure 5.

Figure 7 illustrates the condition where one of the end shaping discs 36 and 37 is tuned to a frequency $f_3$ at the low frequency side of the band pass and the other one is tuned to the frequency $f_1$ at the high frequency side of the band pass. This causes the high and low sides of the filter response curve to be steepened.

Figure 8:
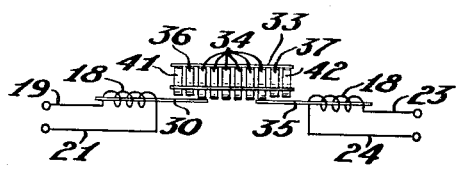
Figure 8 illustrates a modification of this invention.
Figure 9:
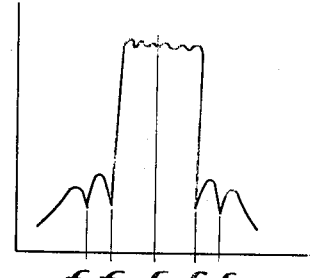
Figure 9 illustrates the response curve of the mechanical filter illustrated in Figure 8.

Figure 8 illustrates a further modification wherein two end shaping discs 41 and 42 have been added to the filter so that the response curve may be shaped as shown in Figure 9. The center discs 34 are tuned to the frequency $f_0$. Shaping discs 36 and 41, in combination, produce two parallel resonant peaks with frequencies determined by mutual coupling and tuning. Similarly, the pair of discs 37 and 42 produce two parallel resonant peaks. The two shaping discs at one end of the filter may be tuned and coupled to produce maximum attenuation at $f_1$ and $f_2$ on the high side of the pass band, and the other pair may be adjusted for maximum attenuation at $f_3$ and $f_4$ on the low side of the pass band.

The principle of the present invention is to add response shaping discs in such a fashion that the steepness of the response curve will be increased, thereby allowing even greater selectivity with an electro-mechanical filter.

Although this invention has been described with respect to particular embodiments thereof, it is not to be so limited as changes and modifications may be made therein which are within the full intended scope of the invention, as defined by the appended claims.

I claim:

1. An electromechanical filter comprising, a base plate, a pair of stand-offs mounted on said base plate, a pair of hollow cylinders supported by said stand-offs, a driving coil mounted in one of said cylinders, a pick-up coil mounted in the other cylinder, a pair of supporting discs mounted respectively to said cylinders, a plurality of coupling wires extending between the peripheries of said supporting discs, a pair of curve shaping discs attached to said coupling wires adjacent said supporting discs, a plurality of active discs supported by said coupling wires between said curve shaping discs, a first end wire attached to the periphery of one of the end active discs and extending through the driving coil, and a second end wire attached to the periphery of the other end active disc and extending through the pick-up coil.

2. An electromechanical filter comprising, a base plate, a pair of stand-offs mounted on said base plate, a pair of hollow cylinders supported by said stand-offs, a driving coil mounted in one of said cylinders, a pick-up coil mounted in the other cylinder, a pair of supporting discs mounted respectively to said cylinders, a plurality of coupling wires extending between the peripheries of said supporting discs, a plurality of curve shaping discs attached to said coupling wires adjacent said supporting discs, a plurality of active discs supported by said coupling wires between said plurality of curve shaping discs, a first end wire attached to the periphery of one of the end active discs and extending through the driving coil, and a second end wire attached to the periphery of the other end active disc and extending through the pick-up coil.

3. An electromechanical filter comprising, a base plate, a pair of stand-offs mounted on said base plate, a pair of hollow cylinders supported by said stand-offs, a driving coil mounted in one of said cylinders, a pick-up coil mounted in the other cylinder, a pair of supporting discs mounted respectively to said cylinders, a plurality of coupling wires extending between the peripheries of said supporting discs, four curve shaping discs attached to said coupling wires adjacent said supporting discs, a plurality of active discs supported by said coupling wires between said four curve shaping discs, a first end wire attached to the periphery of one of the end active discs and extending through the driving coil, and a second end wire attached to the periphery of the other end active disc and extending through the pick-up coil.

4. An electromechanical filter comprising, a pair of support means, a plurality of coupling wires extending between said support means, a first curve shaping disc attached to the coupling wires adjacent one of the support means, a second curve shaping disc attached to the coupling wires adjacent the other support means, a plurality of active discs attached to the coupling wires between the first and second curve shaping discs, first energy coupling means connected to a first end active disc, and a second energy coupling means attached to the other end active disc.

5. An electromechanical filter comprising, a pair of support means, a plurality of coupling wires extending between said support means, a first plurality of curve shaping discs attached to the coupling wires adjacent one of the support means, a second plurality of curve shaping discs attached to the coupling wires adjacent the other support means, a plurality of active discs attached to the coupling wires between the first and second plurality of curve shaping discs, first energy coupling means connected to a first end active disc, and a second energy coupling means attached to the other end active disc.

6. An electromechanical filter comprising, a pair of support means, a plurality of coupling wires extending between said support means, a first pair of curve shaping discs attached to the coupling wires adjacent one of the support means, a second pair of curve shaping discs attached to the coupling wires adjacent the other support means, a plurality of active discs attached to the coupling wires between the first and second pairs of curve shaping discs, first energy coupling means connected to a first end active disc, and a second energy coupling means attached to the other end active disc.

7. An electromechanical filter comprising, a base plate, a pair of stand-offs mounted on said base plate, a pair of hollow cylinders supported by said stand-offs, a driving coil mounted in one of said cylinders, a pick-up coil mounted in the other cylinder, a pair of supporting discs mounted, respectively, to said cylinders, a plurality of coupling wires extending between the peripheries of said supporting discs, a pair of curve shaping discs attached to said coupling wires adjacent said supporting discs, a plurality of active discs supported by said coupling wires between said curve shaping discs, a first end wire attached to the periphery of one of the end active discs and extending through the driving coil, a second end wire attached to the periphery of the other end active disc and extending through the pick-up coil, said active discs having the same resonant frequency, and the pair of curve shaping discs having the same resonant frequency which is slightly higher than the resonant frequency of the active discs.

8. An electromechanical filter comprising, a base plate, a pair of stand-offs mounted on said base plate, a pair of hollow cylinders supported by said stand-offs, a driving coil mounted in one of said cylinders, a pick-up coil mounted in the other cylinder, a pair of supporting discs mounted respectively to said cylinders, a plurality of coupling wires extending between the peripheries of said supporting discs, a pair of curve shaping discs attached to said coupling wires adjacent said supporting discs, a plurality of active discs supported by said coupling wires between said curve shaping discs, a first end wire attached to the periphery of one of the end active discs and extending through the driving coil, a second end wire attached to the periphery of the other end active disc and extending through the pick-up coil, said active discs having the same resonant frequency, and one of the curve shaping discs having a resonant frequency slightly lower than the resonant frequency of the active discs and the other having a resonant frequency which is slightly higher than the other discs.

9. An electromechanical filter comprising, a base plate, a pair of stand-offs mounted on said base plate, a pair of hollow cylinders supported by said stand-offs, a driving coil mounted in one of said cylinders, a pick-up coil mounted in the other cylinder, a pair of supporting discs mounted respectively to said cylinders, a plurality of coupling wires extending between the peripheries of said supporting discs, a pair of curve shaping discs attached to said coupling wires adjacent said supporting discs, a plurality of active discs supported by said coupling wires between said curve shaping discs, a first end wire attached to the periphery of one of the end active discs and extending through the driving coil, a second end wire attached to the periphery of the other end active disc and extending through the pick-up coil, said active discs having the same resonant frequency, and one of the curve shaping discs having a resonant frequency slightly lower than the resonant frequency of the active discs and the other of the curve shaping discs having a frequency which is slightly lower than the one curve shaping disc.

10. An electromechanical filter comprising, a pair of support means, a plurality of coupling wires extending between said support means, a first curve shaping disc attached to the coupling wires adjacent one of the support means, a second curve shaping disc attached to the coupling wires adjacent the other support means, a plurality of active discs attached to the coupling wires between the first and second curve shaping discs, first energy coupling means connected to a first end active disc, second energy coupling means attached to the other end active disc, said active discs having the same resonant frequency, and the pair of curve shaping discs having the same resonant frequency which is slightly higher than the resonant frequency of the active discs.

11. An electromechanical filter comprising, a pair of support means, a plurality of coupling wires extending between said support means, a first curve shaping disc attached to the coupling wires adjacent one of the support means, a second curve shaping disc attached to the coupling wires adjacent the other support means, a plurality of active discs attached to the coupling wires between the first and second curve shaping discs, first energy coupling means connected to a first end active disc, a second energy coupling means attached to the other end active disc, said active discs having the same resonant frequency, and one of the curve shaping discs having a resonant frequency slightly lower than the resonant frequency of the active discs and the other having a resonant frequency which is slightly higher than the other discs.

12. An electromechanical filter comprising, a pair of support means, a plurality of coupling wires extending between said support means, a first curve shaping disc attached to the coupling wires adjacent one of the support means, a second curve shaping disc attached to the coupling wires adjacent the other support means, a plurality of active discs attached to the coupling wires between the first and second curve shaping discs, first energy coupling means connected to a first end active disc, a second energy coupling means attached to the other end active disc, said active discs having the same resonant frequency, and one of the curve shaping discs having a resonant frequency slightly lower than the resonant frequency of the active discs and the other of the curve shaping discs having a frequency which is slightly lower than the one curve shaping disc.

13. An electromechanical filter comprising, a pair of support means, a plurality of coupling wires extending between said support means, a first pair of curve shaping discs attached to the coupling wires adjacent one of the support means, a second pair of curve shaping discs attached to the coupling wires adjacent the other support means, a plurality of active discs attached to the coupling wires between the first and second pairs of curve shaping discs, first energy coupling means connected to a first end active disc, a second energy coupling means attached to the other end active disc, said active discs having the same resonant frequency, and a first pair of said curve shaping discs having two resonant frequencies both being slightly higher than the resonant frequency of the active discs, and the second pair of curve shaping discs being resonant at two different frequencies, both of which are slightly lower than the resonant frequency of said active discs.

References Cited in the file of this patent

UNITED STATES PATENTS

| | | |
|---|---|---|
| 2,578,452 | Roberts | Dec. 11, 1951 |
| 2,615,981 | Doelz | Oct. 28, 1952 |